_United States Patent Office_

2,759,021
Patented Aug. 14, 1956

2,759,021
SUBSTITUTED TRIMETHYLENE DIAMINES

Fielding S. Gaar and Richard A. Reck, Chicago, Ill., assignors to Armour and Company, Chicago, Ill., a corporation of Illinois No Drawing. Application January 19, 1951,
Serial No. 206,918

8 Claims. (Cl. 260—570.6)

Our invention relates to substituted trimethylene diamines, and more particularly to the N-aliphatic-N,N',N'-tris(hydroxyalkyl)-trimethylene diamines where the N-aliphatic radical is a straight chain saturated or unsaturated group having 8 to 30 carbon atoms and where the hydroxyalkyl radical has at least 2 carbon atoms and at least 1 hydroxy group. Our invention also relates to methods for preparing these compounds as hereinafter described.

These substituted trimethylene diamine compounds are useful as wetting agents, emulsifiers, corrosion inhibitors, and in the oil industry, as secondary oil recovery agents. To our knowledge, the compounds and the method of their preparation have hitherto been unknown.

The preferred process of our invention involves alkylating a suitable N-aliphatic-trimethylene diamine compound at controlled temperatures, followed by purification and isolation steps where necessary.

The reaction is advantageously carried out in either a sealed reaction vessel or in conventional reflux apparatus. Especially is this so where the reaction involves the use of low boiling constituents. Although we usually operate our process at a pressure believed to be of the order of 1 atmosphere, the operation may be practiced successfully at much higher or much lower pressures.

Our process may be carried out simply by contacting the reactants. Advantageously we may agitate and heat the reactants until completion of the reaction, although the heat and agitation are not essential. Our process may be practiced over a wide range of temperatures, but we prefer first to contact the reactants at a temperature controlled to about 25° C. until they are well mixed, and then to heat the mixture to reflux temperatures. This control of temperatures favors the desired reaction and avoids undesired side reactions which tend to lower the yield.

At temperatures substantially below 25° C. the reaction proceeds at an undesirably slow rate. Where the reflux type of apparatus is used, a desirable maximum temperature is reached at the point of mild refluxing, and in the use of the sealed type of apparatus we prefer to avoid temperatures which are high enough to produce polymerization. We find that polymerization may occur at about 200° C.

In general, the length of time necessary for the completion of the reaction is dependent upon the reaction temperature, and may be 1 hour or less, or 15 or 20 hours. Desirably, the reaction should be completed within 3 to 5 hours.

A number of diamine compounds are suitable for the preparation of N-aliphatic-N,N',N'-tris(hydroxyalkyl)-trimethylene diamines. In specific embodiments of our invention, we have used N-octyl-trimethylene diamine, N-nonyl-trimethylene diamine, N-decyl-trimethylene diamine, N-dodecyl-trimethylene diamine, N-octadecenyl-trimethylene diamine, and N-tallow-trimethylene diamine. The tallow radical just referred to is a straight chain aliphatic radical of the fatty acids of tallow. The process is not limited to the use of these diamine compounds, however. Indeed, it is possible to employ any trimethylene diamine compound one of whose amino hydrogen atoms has been substituted by a straight chain saturated or unsaturated aliphatic group having 8 to 30 carbon atoms. Preferably, we use the dodecyl and tallow trimethylene diamines.

We may use any alkylating agent having a hydroxy radical or anhydrides thereof. For example, we may use alkylene oxides, epoxides, halohydrins, or aralkylene oxides. For the sake of illustration, specific examples are: ethylene oxide, 1,2-propylene oxide, 1,3-propylene oxide, isobutylene oxide, ethylene halohydrin, alpha and beta forms of glycerol monohalohydrin, trimethylene halohydrin, and styrene oxide. Conveniently, we use ethylene oxide, 1,3-propylene oxide, or glycerol alpha-chlorohydrin. When a halohydrin is used, it is necessary to remove the hydrohalic acid, subsequently split off as a by-product, by precipitating it as with an alkali or carbonate. The insoluble inorganic salts thus formed are removed by filtration.

In general, the reaction proceeds more readily when the reacting components are in intimate contact. For this reason it is desirable to combine the reactants in solution form or in the liquid or the vapor phase. If the initial reactants are in solid form, they may be conveniently dissolved in low molecular weight alcohols, ethers or hydrocarbons. For example, methanol, ethanol, isopropanol, benzene, diethyl ether and the like are desirable for this purpose.

Following are specific examples of the preparation of our products. In these examples, proportions are given in parts by weight:

Example I

An Adkins shaking-type autoclave is charged with 24.2 parts of N-dodecyl-trimethylene diamine and 39.2 parts of ethylene oxide. With agitation and heating, the reaction is allowed to proceed for 5 hours at 100° C. under pressure developed by the reaction itself. The reaction product, a viscous, mahogany-colored liquid, soluble in water, is N-dodecyl-N,N',N'-tris(2 - hydroxyethyl) - trimethylene diamine.

Example II 66 parts of ethylene oxide are added, over a period of one hour at a temperature of 25° C., to 162 parts of N-tallow-trimethylene diamine which have been dissolved in 79.3 parts of methanol contained in a reaction vessel which is fitted with stirrer, dropping funnel and Dry Ice condenser. During the addition step, the temperature is controlled to 25° C. by means of stirring and cooling, until the components are well mixed. The mixture is then heated with refluxing to a temperature of 60 to 65° C. until there is no further reflux, and methanol is removed under reduced pressure to isolate the product, N-tallow-N,N',N'-tris(2-hydroxyethyl)-trimethylene diamine. In this example the actual gain in weight is approximately 92% of the theoretical gain due to ethylene oxide addition.

Example III 34.4 parts of N-octyl-trimethylene diamine and 26.4 parts of ethylene oxide are mixed and heated in an Adkins shaking-type autoclave. The reaction is allowed to proceed for 5 hours at a temperature of 100° C. The product is N-octyl-N,N',N'-tris(2-hydroxyethyl)-trimethylene diamine.

Example IV 21.1 parts of N-tallow-trimethylene diamine, 35.2 parts of ethylene oxide, and 2 parts of water are mixed and heated for 5 hours at 100° C. in the manner described in Example I. The product is collected in ethyl alcohol, and alcohol and water are then removed under reduced pressure leaving the desired compound, N-tallow-N,N',N'-tris(2-hydroxyethyl)-trimethylene diamine. In this example, water is conveniently used as a vehicle although it is not essential to the practice of our invention.

*Example V*

In a further variation of our process, we heat 37.2 parts of N-octyl-trimethylene diamine to a temperature of 150° C. in a reaction vessel equipped with a Dry Ice condenser, a stirrer, and a gas inlet tube. While the temperature is held at about 150° C., 35 parts of gaseous 1,2-propylene oxide are passed through and reacted with the diamine during a period of 3 hours. The mixture is then held at 150–160° C. for one additional hour. We find that there is a gain in weight of about 97% of the theoretical due to the propylene oxide. The product is N-octyl-N,N',N'-tris(2-hydroxypropyl)-trimethylene diamine.

*Example VI*

The same procedure is used as set forth in Example V except that 20.0 parts of gaseous ethylene oxide and 21.2 parts of N-tallow-trimethylene diamine are used instead of N-octyl diamine and propylene oxide. The gain in weight due to the addition of ethylene oxide is 89% of the theoretical. The product is N-tallow-N,N',N'-tris-(2-hydroxyethyl)-trimethylene diamine.

*Example VII*

In a reaction vessel equipped with a stirrer and a reflux condenser, 63 parts of N-tallow-trimethylene diamine are dissolved in 200 parts of isopropanol and are stirred and heated to react with 66.3 parts of glycerol alpha-chlorohydrin. Along with the glycerol chlorohydrin we incorporate 4.4 parts of 85% sodium hydroxide in the reaction mixture for the purpose of absorbing the hydrochloric acid which is split off in the interaction between amino groups and chlorohydrin molecules. The mixture is heated under reflux for 3½ hours to complete the reaction.

Insoluble inorganic salts formed during the process are removed by filtration, and isopropanol is distilled off under reduced pressure, leaving a viscous, mahogany-colored liquid product which is sparingly soluble in water but soluble in 50% aqueous alcohol. This product is N-tallow-N,N',N'-tris(2,3-dihydroxypropyl) trimethylene diamine.

*Example VIII*

Using the same apparatus as described in Example VII, we charge the reaction vessel with 50 parts of N-dodecyl-trimethylene diamine, 68 parts of glycerol alpha-chlorohydrin, 45 parts of methanol, and 20 parts of potassium carbonate. We then stir and heat this mixture under reflux for 4 hours. In order to assure completion of the reaction we add 22 parts of sodium carbonate and 45 parts of methanol and heat the whole under reflux for an additional 20 hours.

Insoluble material is removed by filtration, and methanol is distilled off under reduced pressure. The product, N-dodecyl-N,N',N'-tris(2,3-dihydroxypropyl) trimethylene diamine, is a viscous, straw-colored, water-soluble liquid.

*Example IX*

A reaction vessel, as described in Example II, is charged with 163 parts of N-tallow-trimethylene diamine and 150 parts of methanol, and over a period of 5 minutes, 44 parts of ethylene oxide are added dropwise with stirring meanwhile controlling the temperature to 25° C. About one hour later an additional 44 parts of ethylene oxide are added under the same conditions. At this point the reaction mixture is stirred and heated when necessary to reflux temperatures for a period of 4 hours or until completion of the reaction. Methanol is then removed under reduced pressure. The product is N-tallow-N,N',N'-tris(2-hydroxyethyl)-trimethylene diamine.

*Example X*

To 49 parts of N-octyl-trimethylene diamine in a reaction vessel described in Example II, 180 parts of styrene oxide are added dropwise over a three-hour period at 200–210° C. The reaction mixture is stirred and heated at 200–210° C. for 4 additional hours. The unreacted styrene oxide and amine are removed by fractional distillation under reduced pressure. The residue contains N-octyl-N,N',N'-tris(1-phenyl,2-hydroxyethyl)-trimethylene diamine.

*Example XI*

Using a reflux apparatus described in Example II, 44 parts of ethylene oxide are bubbled into a mixture containing 1266 parts of N-octadecenyl-trimethylene diamine in 100 parts of methanol over a period of 2 hours at a temperature of 45–55° C. An additional 616 parts of ethylene oxide are added dropwise but rapidly at 45–55° C., allowing 10-minute intervals between each 44 part addition. When reflux is no longer perceptible, the temperature is raised to 65–70° C. for 1 hour. The methanol is removed at 65–70° C. under reduced pressure for a period of 5 hours. The product is N-octadecenyl-N,N',N'-tris(2-hydroxylethyl)-trimethylene diamine. The gain in weight due to ethylene oxide is about 93% of the theoretical.

The foregoing modes of preparation are to be taken as illustrative of our invention. Other modifications and variations, all within the scope and spirit of our invention, will readily occur to those skilled in the art.

Having thus described our invention, what we claim is:

1. A compound of the formula

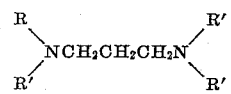

wherein R is a straight chain aliphatic hydrocarbon group having from 8 to 30 carbon atoms and R' is a radical selected from the group consisting of hydroxyalkyl having 2 to 4 carbon atoms and from 1 to 2 hydroxyl groups, and 2-hydroxy-2-phenylethyl.

2. A compound of the formula

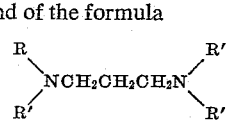

wherein R is a straight chain aliphatic hydrocarbon group having from 8 to 30 carbon atoms and R' is an hydroxyalkyl radical having from 2 to 4 carbon atoms and from 1 to 2 hydroxyl groups.

3. A compound of the formula

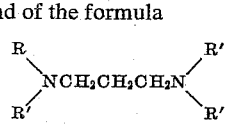

wherein R is a straight chain aliphatic hydrocarbon group having from 8 to 30 carbon atoms and R' is a 2-hydroxy-2-phenylethyl radical.

4. A compound of the formula:

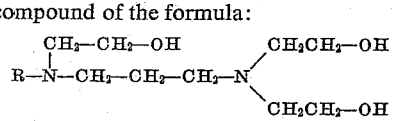

where R is a straight chain aliphatic hydrocarbon group having from 8 to 30 carbon atoms.

5. A compound of the formula:

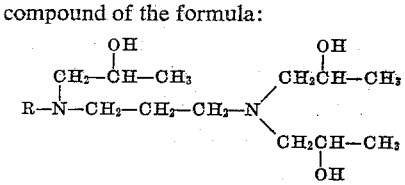

where R is a straight chain aliphatic hydrocarbon group having from 8 to 30 carbon atoms.

6. A compound of the formula:

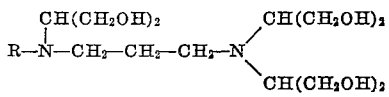

where R is a straight chain aliphatic hydrocarbon group having from 8 to 30 carbon atoms.

7. A compound of the formula:

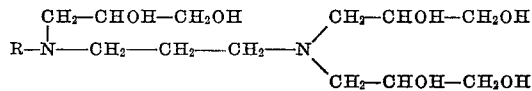

where R is a straight chain aliphatic hydrocarbon group having from 8 to 30 carbon atoms.

8. A compound of the formula:

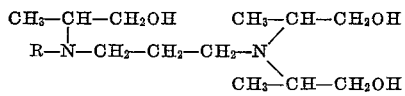

where R is a straight chain aliphatic hydrocarbon group having from 8 to 30 carbon atoms.

References Cited in the file of this patent

UNITED STATES PATENTS

| | | |
|---|---|---|
| 2,046,720 | Bottoms | July 7, 1936 |
| 2,214,352 | Schoeller et al. | Sept. 10, 1940 |
| 2,243,329 | De Groote | May 27, 1941 |
| 2,695,314 | Kosmin | Nov. 23, 1954 |